(12) United States Patent
Chrysler et al.

(10) Patent No.: US 6,273,132 B1
(45) Date of Patent: Aug. 14, 2001

(54) IN-LINE VALVE

(75) Inventors: Jim D. Chrysler, Wyoming; Robert S. Creswell, Grand Rapids, both of MI (US)

(73) Assignee: Amerikam, Inc., Grand Rapids, MI (US)

( * ) Notice: Subject to any disclaimer, the term of this patent is extended or adjusted under 35 U.S.C. 154(b) by 0 days.

(21) Appl. No.: 09/569,192

(22) Filed: May 11, 2000

Related U.S. Application Data (63) Continuation-in-part of application No. PCT/US98/26196, filed on Dec. 10, 1998.
(60) Provisional application No. 60/068,059, filed on Dec. 18, 1997.

(51) Int. Cl.[7] .................................................. F16K 3/00
(52) U.S. Cl. ..................... 137/625.31; 251/208; 137/360

(58) Field of Search ................................ 137/625.31, 360, 137/625.32; 251/208

(56) References Cited

U.S. PATENT DOCUMENTS

| 5,025,832 | * | 6/1991 | Taylor | 137/625.31 |
| 5,025,833 | * | 6/1991 | Hendrick | 137/625.31 |
| 5,392,805 | * | 2/1995 | Chrysler | 137/360 X |

* cited by examiner

*Primary Examiner*—Kevin Lee
(74) *Attorney, Agent, or Firm*—Rader, Fishman, Grauer & McGarr (57) ABSTRACT

An in-line valve for a fluid line preferably in the environment of a hydrant, comprising a casing to which is mounted an attachment device and in which is disposed a rotatable stem. The attachment device and stem both have dividing walls in which are formed corresponding fluid ports through which fluid flows when the ports are aligned.

39 Claims, 5 Drawing Sheets

IN-LINE VALVE

This application is a continuation-in-part of and claims the benefit of International application PCT/US98/26196, filed Dec. 10, 1998, which claims priority to U.S. Provisional Patent Application Serial No. 60/068,059, filed Dec. 18, 1997.

BACKGROUND OF THE INVENTION

1. Field of the Invention

The invention is directed to a valve for controlling the flow of fluid; and, more particularly, the invention is directed to an in-line valve having a simplified valve stack construction.

2. Related Art

Contemporary in-line valves comprise a fitting with a valve seat seal, which is mounted in a fluid or water supply line. Typically, a portion of the supply line is removed and the fitting replaces the removed portion. The fitting is usually threaded on or welded to the supply line.

The valve seat includes a rotatable shaft extending from the interior to the exterior of the fitting. The exterior end of the shaft mounts a handle or similar structure for grasping and rotating the shaft. The interior end of the shaft is mounted to a disk or washer. As the handle is rotated, the valve seat is moved into or out of compressive contact with a seal to close or open the valve depending on the direction of handle rotation.

One disadvantage of the valve seat seal is that it requires multiple turns of the shaft to fully open or fully close the valve seat. It can also take a substantial amount of force to rotate the shaft and to compress the valve seat a sufficient amount to obtain an adequate seal. As the valve seat wears, especially from over-tightening, greater compressive force is usually needed to obtain a complete seal. The multiple rotations of the handle and the excessive force needed to rotate the handle and seal the valve is considered an inconvenience by many users.

An alternative to the valve seat seal is a disk stack, which generally takes the form of a fixed disk and a rotating disk, each having corresponding openings that are aligned in one rotational position to permit water flow and un-aligned in another rotational position o prevent water flow. Examples of such in-line valves are show in U.S. Pat. Nos. 3,426,797, issued Oct. 20, 1965 and 5,088,689, issued Feb. 18, 1992.

The disk stacks are advantageous in that the control of water flow running through the disks is dependent on the rotational position of the disks, instead of the axial compressive force of the seat seal valve. The ceraminc disks are are disadvantageous in that they are difficult to manufacture and are subject to breakage.

SUMMARY OF THE INVENTION

The invention relates to an in-line valve alone or in the environment of a hydrant for controlling fluid flow through a supply line. The in-line valve comprises an outer casing that defines a casing passageway having a longitudinal axis. An attachment device is mounted to the outer casing for connecting the outer casing to a supply line. The attachment device defines an attachment passageway, and has a dividing wall spanning the attachment passageway with a fluid port extending through the dividing wall. The valve further includes a valve stem defining a valve stem passageway and has a dividing wall spanning the valve stem passageway with a fluid port extending therethrough. The valve stem passageway is in fluid communication with the casing passageway. The attachment device dividing wall cooperates with the valve stem wall to control fluid flow from the supply line through said valve by the movement of the valve stem wall relative to the dividing wall between an open position and a closed position where the at least one fluid port of the valve stem wall and the at least one port of the dividing wall are fluidly connected and fluidly disconnected, respectively.

Preferably, the valve stem wall comprises a plate mounted to the valve stem, with the valve stem fluid port extending through the plate. A seal can surround one of the dividing wall fluid ports and the valve stem fluid port to seal the dividing wall relative to the plate.

The valve can further include a handle connected to the valve stem with a portion of the handle extends externally of the casing for use in rotating the valve stem relative to the attachment device. The externally extending handle portion extends from the casing in a direction that is radial to the casing longitudinal axis. The externally extending handle portion can extend from the casing in a direction that is axial to the casing longitudinal axis. A control knob can be mounted to the handle.

Preferably, the attachment device comprises an attachment portion and a removable casing portion, with the dividing wall spanning the removable casing portion.

The valve stem comprises a body that is received within the removable casing portion, and the plate is mounted to the body. The body can include a handle coupler, which connects to one end of the handle, which can mount a control knob In another aspect of the invention, the in-line valve comprises an outer casing defining a casing passageway engageable with the supply line and an operating handle opening formed in and extending through a sidewall of said outer casing. An attachment device is receivable within and engageable with said outer casing for connecting said outer casing to the supply line. The attachment device includes an attachment passageway therethrough for fluid to flow through said valve. The attachment device further includes a dividing wall spanning said attachment passageway and having at least one fluid flow port formed therein. The in-line valve also includes a valve stem defining a valve stem passage, and which is mounted for selective rotation about a central axis. A plate spans an opening of said valve stem passage and has at least one fluid port formed therein. The plate being mounted onto said valve stem so as to be axially aligned along said central axis and abutting said dividing wall, wherein the selective rotation of the valve stem between an open position and a closed position about said central axis controls fluid flow through said valve by aligning and mis-aligining the fluid ports of said dividing wall and said plate. A handle extends from the valve stem through the handle opening to enable a user to rotate the valve stem.

BRIEF DESCRIPTION OF THE DRAWINGS

The invention will now be described with reference to the drawings in which.

DETAILED DESCRIPTION

Figure 1:
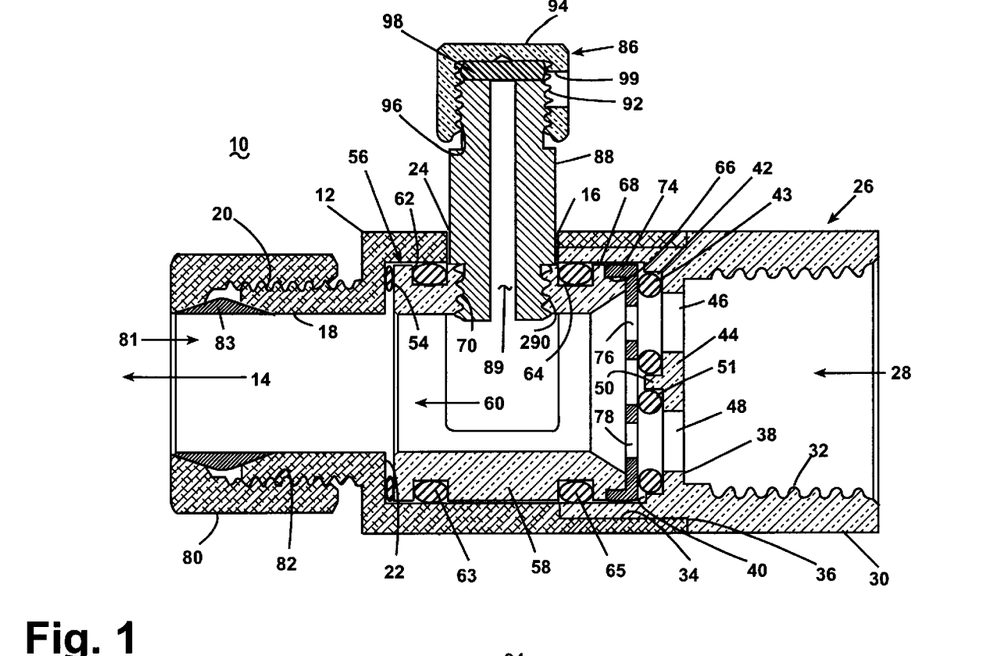
FIG. 1 is a sectional view of a first embodiment of the in-line valve according to the invention in the open position and using a dividing wall and a rotating metal plate as a portion of a valve stack.

FIG. 1 illustrates a first embodiment in-line valve 10. The in-line valve 10 comprises an outer casing 12, which defines a passageway 14 extending through the outer casing 12. The outer casing 12 comprises a large diameter portion 16 and a small diameter portion 18, having external threads 20. At the junction of the large diameter portion 16 and the small diameter portion 18, there is an annular shoulder 22 extending into the internal passageway 14. An operating handle slot 24 extends through the wall of the large diameter portion 16.

The in-line valve 10 further comprises an attachment device 26, which defines an internal passageway 28. The attachment device 26 comprises a first portion 30, having internal threads 32 and a reduced diameter portion 34. The outer diameter of the reduced diameter portion 34 is sized to be received within the large diameter portion 16 of the outer casing 12. The junction of the first portion 30 and the reduced diameter portion 34 define an annular shoulder 36, which abuts the upstream end of the large diameter portion 16 when the attachment device 26 is mounted to the outer casing 12.

A dividing wall 44 extends across the passageway 28 and forms an annular shoulder 38, which has an annular bearing surface 40 and a seal seat 42. The dividing wall 44 includes a pair of diametrically opposed fluid ports 46, 48. A seal stud 50 extends from the downstream face of the dividing wall 44. An o-ring 51 circumscribes the seal stud 50.

The first embodiment in-line valve 10 further comprises a rotating stem 56 having a generally cylindrical body 58, defining an internal passageway 60 through which fluid can flow. Annular grooves 62 and 64 are provided in the exterior surface of the cylindrical body 58 and receive o-ring seals 63, 65. The upstream end of the cylindrical body 58 has a reduced diameter portion 66 having a slightly inwardly tapered cross section. The junction of the reduced diameter portion 66 with the rest of the cylindrical body 58 defines an annular stop 68. A threaded opening 70 extends through the side of the cylindrical body 58 of the rotating stem 56 and is located between the annular grooves 62 and 64.

The rotating stem 56 further comprises a plate 74, which extends across the upstream end of the cylindrical body 58. The plate 74 and the dividing wall 44 combine to form a valve device. The plate 74 has a pair of diametrically opposed ports 76 and 78, which when aligned with the holes 46 and 48 in the dividing wall 44, permit fluid to flow through the in-line valve 10. The plate 74 is crimped onto the reduced diameter portion 66 of the cylindrical body 58 to mount the plate to the cylindrical body.

The plate 74 is preferably made from metal, such as stainless steel or brass. The late 74 can also be made for non-metals, including plastics and ceramics.

The first embodiment in-line valve 10 also includes an operating handle 86 comprising a rotating stud 88 with externally threaded ends 90 and 92. The rotating stud 88 defines an internal passage 89, extending completely through the rotating stud 88. The operating handle 86 further comprises a bleeder cap 94 having internal threads 96. A bleeder seal 98 is disposed within the interior of the bleeder cap 94 at the end of the internal threads 96. A bleeder vent opening 99 extends through the sidewall of the bleeder cap 94.

The in-line valve 10 includes a ferrule cap 80 defining an internal passageway 81, an upstream portion of which has internal threads 82. A ferrule 83 spans the ferrule cap 80 and the small diameter portion 18 of the outer casing 12 to secure the ferrule cap 80 to the outer casing 12.

To assemble the first embodiment in-line valve 10, the plate 74 is first mounted, preferably by crimping or bonding, onto the cylindrical body 58 of the rotating stem. 0-rings 63 and 65 are then placed in annular grooves 62 and 64, respectively. Similarly, o-ring 43 is placed in seal seat 42 and o-ring 59 is disposed around the seal embossment 50. Once the o-ring seals are in place, the assembled rotating stem 56 is inserted into the opened end of the reduced diameter portion 34 of the attachment device 26 until the plate 74 contacts and compresses the o-rings 43 and 51. The insertion of the rotating stem 56 is limited by the plate 74 abutting the annular bearing surface 40.

After the rotating stem 56 is inserted into the attachment device 26, the outer casing 12 is mounted onto the attachment device 26 by inserting the reduced diameter portion 34 of the attachment device 26 into the open end of the large diameter portion 16 of the outer casing 12. Prior to insertion of the assembled rotating stem 56 and the attachment device 26, a bearing 54 is inserted into the open end of the large diameter portion 16 of the outer casing 12 and provides a bearing surface for the downstream end of the cylindrical body 58. The assembled rotating stem 56 and attachment device 26 are inserted into the outer casing until the downstream end of the outer casing 12 abuts the annular shoulder 36 of the attachment device 26. In this position, the downstream end of the cylindrical body 58 contacts and bears against the bearing 54.

After the rotating stem 56, attachment device 26, and outer casing 12 are assembled, the operating handle 86 is inserted through the operating handle slot 24 and the lower external threaded portion 90 of the rotating stud 88 is threaded into the internally threaded opening 70 of the cylindrical body 58 to mount the operating handle 86 to the rotating stem 56. The ferrule cap 80 is threadably mounted onto the small diameter portion 18 of the outer casing and the ferrule 84 secures the ferrule cap 80 to the outer casing.

In operation, water is permitted to flow through the aligned passageways 81, 14, 60, and 28 when the rotating stem 56 is oriented in such a way that the ports 76 and 78 of the plate 74 align with the ports 46 and 48 in the dividing wall of the attachment device 26. Flow is prevented through the aligned passageways when the plate ports 76 and 78 are not aligned with the dividing wall ports 46 and 48. The alignment or non-alignment of the corresponding dividing wall ports and plate ports is achieved by rotating the operating handle 86 through approximately a 90° arc or throw. The short rotational throw permits a user of the first embodiment in-line valve 10 a quick way to control the flow of fluid through the first embodiment in-line valve 10. Furthermore, if for any reason the fluid downstream of the plate 74 should need to be bled out of the fluid line, the user only need to unscrew the bleeder cap 94 until the bleeder seal 98 opens the upper end of the internal passage 89 to permit fluid (air or water) to flow through the internal passageway 89 of the rotating stud 88 and through the bleeder vent opening 99.

The first embodiment shows rotating the operating handle 76 through a short throw arc of approximately 90° to obtain complete opening or closing of the valve. Other short throw distances are within the scope of the invention, for example, 180°. The throw distance is dependent upon the orientation of the ports in the dividing wall and the rotating plates 74. The orientation of these openings can be selected as desired depending on the particular design conditions, such as flow rate and operating handle throw angle.

The advantage of the invention is that the water flowing through the in-line valve 10 can be turned on or turned off by merely rotating the operating handle through the relatively short throw angle. This is in contrast to previous in-line valves that used a rotatable handle in connection with a washer seat seal, which require multiple rotations of the handle to completely turn off or turn on the flow of water.

Figure 2:
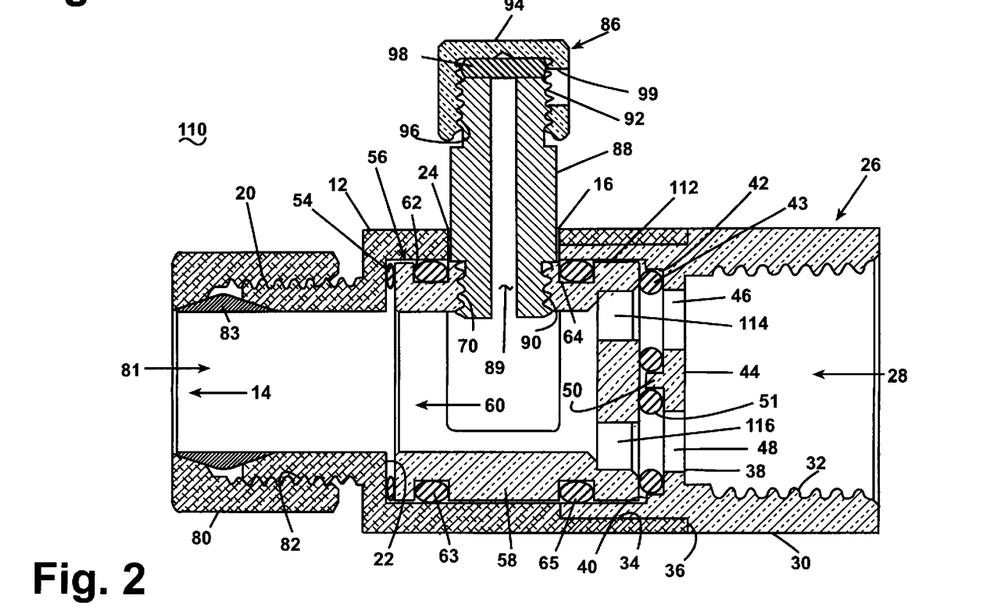
FIG. 2 is a sectional view of a second embodiment of the in-line valve according to the invention shown in the open position and using a dividing wall and an integral plate valve as a portion of a valve stack.

FIG. 2 illustrates a second embodiment in-line valve 110, which is substantially identical to the first embodiment 10. Therefore, like numerals will be used to identify like parts between the second embodiment in-line valve 110 and the first embodiment inline valve 10. New elements associated with the second embodiment in-line valve 110 will be identified with numerals in the 100 series.

The main difference between the second embodiment in-line valve 110 and the first embodiment in-line valve 10 is that the plate 74 of the first embodiment in-line valve 10 is replaced by an end wall 112, which is integrally formed with the rotating stem 56. The end wall 112 has two ports 114 and 116. Preferably, the cylindrical body 58 and the end wall 112 are all formed from brass and the ports 114 and 116 are drilled into the end wall 112. Other metals and nonmetals can also be used to form the body. For example, the body can be made from plastic.

The operation of the second embodiment in-line valve 110 is substantially the same as the operation of the first embodiment in-line valve 10. The flow of water though the in-line valve 110 is controlled by rotating the operating handle 86 through an arc of approximately 90° or throw, which moves the ports 114 and 116 into or out of alignment with the ports 46 and 48 of the dividing wall 37. When the ports 114 and 11 6 of the end wall are aligned with the ports 46 and 48 of the dividing wall, fluid is permitted to flow through the in-line valve. A reduced flow of fluid through the in-line valve can occur when the ports 114 and 116 are partially aligned with the ports 46 and 48. However, when the ports 114 and 116 do not overlap the ports 46 and 48, the flow of fluid through the in-line valve 110 is shut off.

Figure 3:
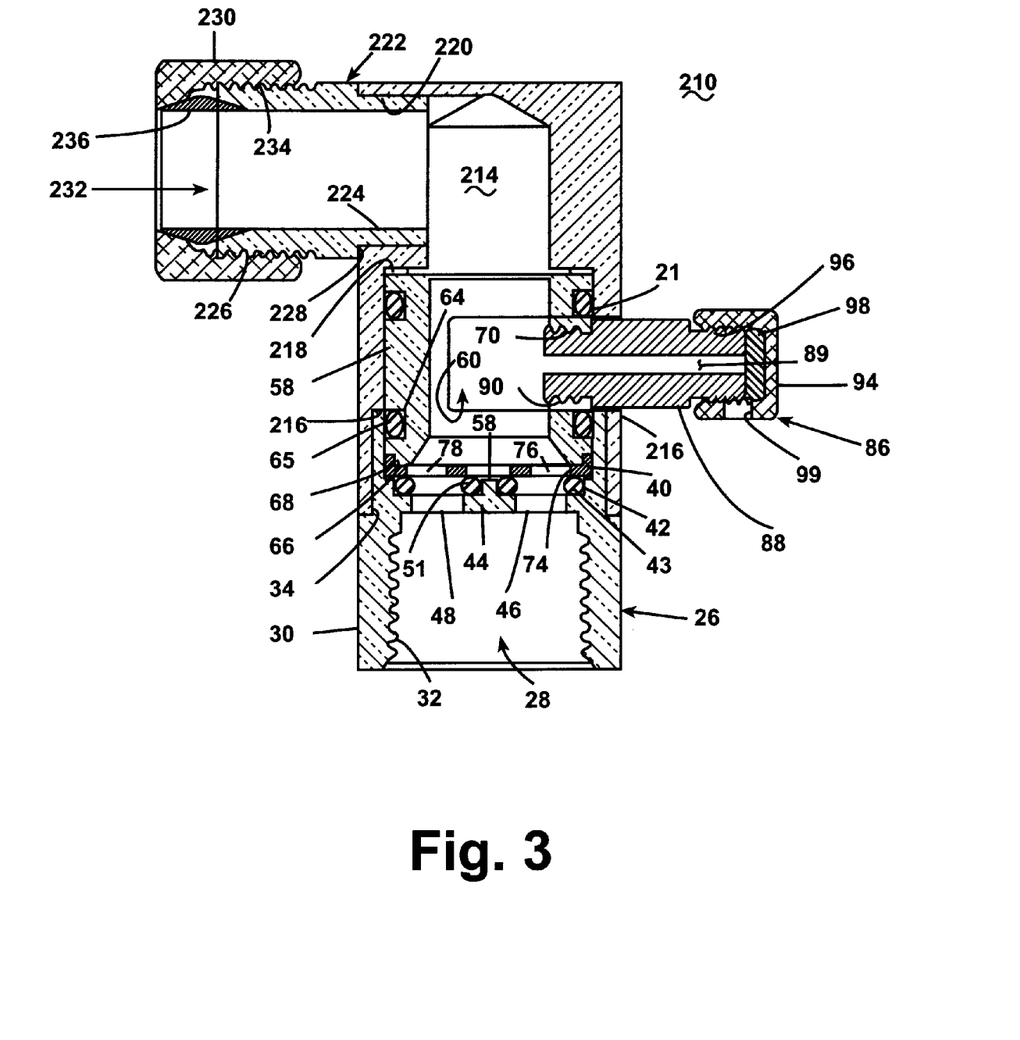
FIG. 3 is a sectional view of a third embodiment of the in-line valve according to the invention shown in the open position and incorporating a right angle casing.

FIG. 3 illustrates a third embodiment inline valve 210, which is substantially identical to the first embodiment in-line valve 10. Therefore, like numbers will be used to identify like parts. New elements associated with the third embodiment in-line valve 210 will use numerals in the 200 series.

The main difference between the third embodiment in-line valve 210 and the first embodiment in-line valve 10 is that the third embodiment in-line valve 210 is a right angle configuration instead of a linear configuration. To achieve the right angle configuration, the third embodiment in-line valve 210 incorporates an outer casing 212 that is different than the outer casing 12 of the first embodiment in-line valve 10. The outer casing 212 defines an internal passage 214 beginning at the upstream end of the outer casing and exiting out the downstream sidewall of the outer casing 212. A partial annular stop 216 and an annular shoulder 218 extend into the passageway 214 of the outer casing and perform that same function as the similar elements in the first embodiment. The casing 212 has a handle slot 216. A downstream outlet opening 220 is formed in the sidewall of the outer casing 212 near the downstream end of the outer casing 212.

The third embodiment in-line valve 210 further includes a right angle extension 222 having a reduced diameter portion 224 on the upstream end and an externally threaded portion 226 on the downstream end. The terminal end of the reduced diameter portion 224 forms an annular stop 228. The right angle extension 222 is mounted to the outer casing 212 by inserting the reduced diameter portion 224 into the outlet opening 220 until the perimeter of the outlet opening contacts the annular stop 228.

The third embodiment in-line valve 210 further comprises a ferrule cap 230 defining an internal passageway 232. The upstream end of the internal passageway 232 contains internal threads 234, which are threaded onto the external threads 226 of the right angle extension 222 to mount the ferrule cap 230. A ferrule 236 is provided within the internal passageway 232 to further secure the ferrule cap 230 to the right angle extension 222.

The operation of the third embodiment in-line valve 210 is identical to the operation of the first embodiment in-line valve 10, except that the water exits at a right angle from the outer casing 212 instead of passing linearly through the outer casing.

Figure 4:
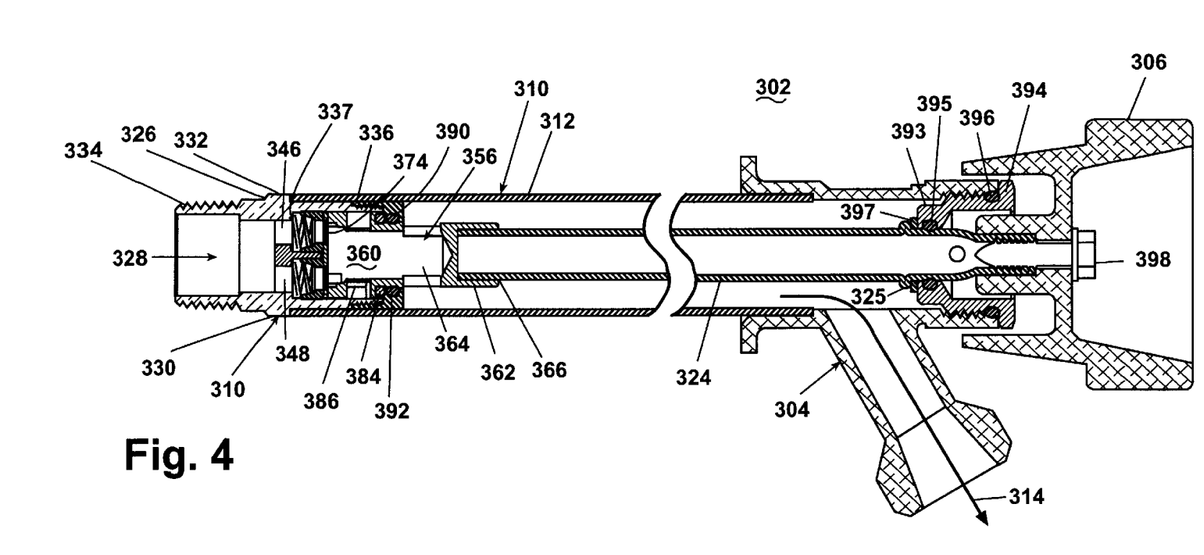
FIG. 4 is a sectional view of a fourth embodiment of the in-line valve according to the invention shown in the environment of a hydrant.
Figure 5:
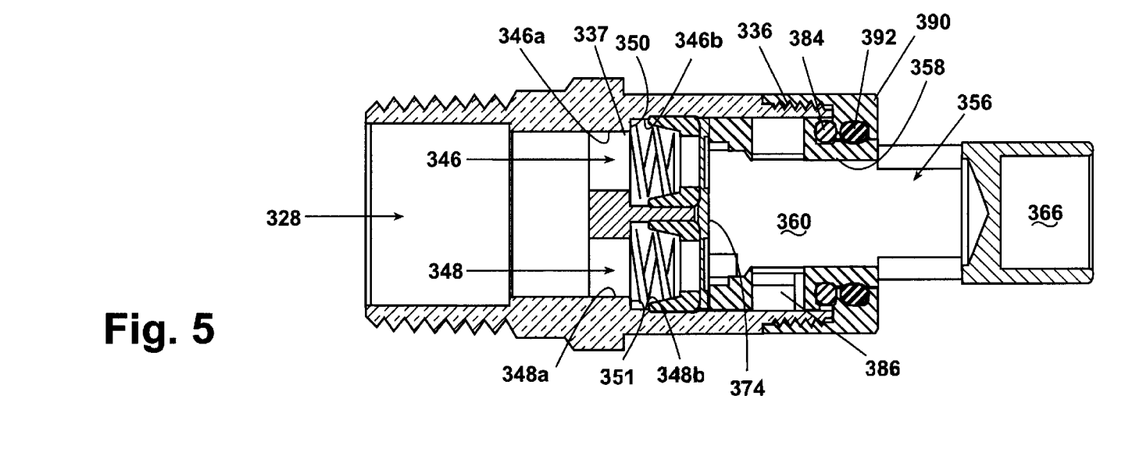
FIG. 5 is an enlarged view of the in-line valve of the fourth embodiment.
Figure 6:
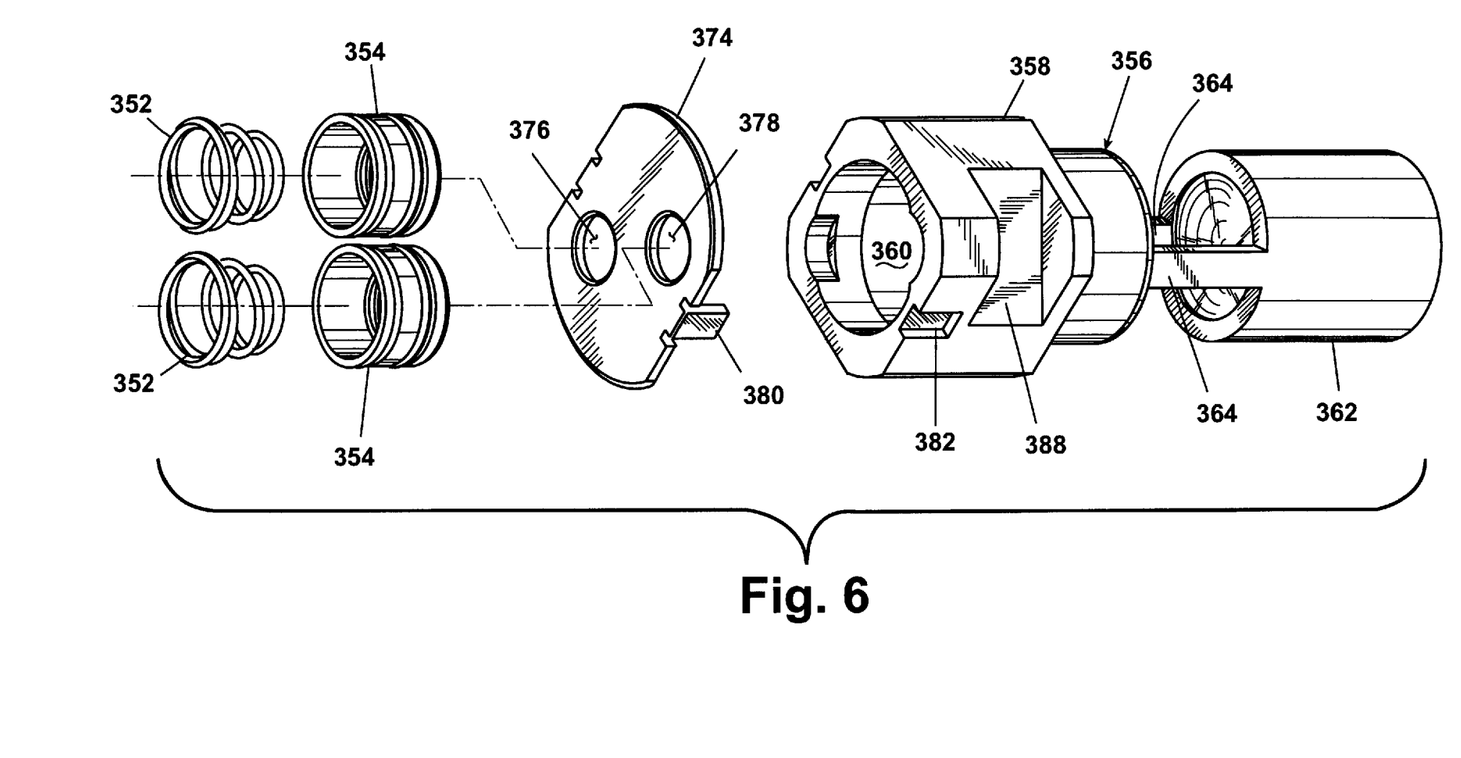
FIG. 6 is an exploded view of the in-line valve of FIG. 5.

FIGS. 4–6 illustrate a fourth embodiment inline valve 310 in the environment of a hydrant 302 comprising a spout 304 and a control knob 306 for controlling the operation of the valve 310.

The inline valve 310 comprises an outer casing 312 that couples to the spout 304 of the hydrant 302 and defines a passageway 314 extending through the casing and fluidly connected to spout 304, whereby fluid passing through the casing can exit the hydrant 302 through the spout 304. The casing and the spout can be formed of a single piece instead of the illustrated two-piece structure.

An attachment device 326 is positioned within and secured to the end of the casing 312 opposite the spout 304 and is coupled to a handle 324 by a stem 356 having a passageway 360. The attachment device 326 defines a passageway 328 that is fluidly connected to the passageway 314 of the casing through the stem 356.

Preferably, the attachment device is bonded to the casing, but can be attached by other suitable methods, including welding and press-fit. Another alternative connection could include internal threads on the casing and external thread on the attachment device permitting the threading of the attachment device to the casing.

The attachment device 326 comprises a collar 330 forming an annular seat 332 against which the end of the casing 312 abuts when the attachment device 326 is slideably inserted into the casing. The annular seat 332 limits the insertion depth of the attachment device 326. External threads 334 are provided on the exterior of the attachment device on the external end of the casing and permit the mounting of the attachment device to a suitable water supply (not shown). Another set of external threads 336 are provided on the end of the attachment device located within the casing 312.

A dividing wall 337 extends across the passageway 328 defined by the interior of the attachment device 326. The dividing wall 337 includes ports 346, 348. The ports 346, 348 include inlet portions 346a, 348a and cup seal portions 346b and 348b. The cup seal portions 346b, 348b are of larger diameter than the inlet portions 346a, 346b, defining a spring seat 350, 351, respectively. The dividing wall 337 effectively defines one portion of a valve stack.

The stem 356 connecting the attachment device 326 to handle 324 comprises a body 358, which is slideably received within the passageway 328 of the attachment device 326 and defines an internal passageway 360. A handle coupler 362 is connected to the body 358 by a pair of axially extending and radially spaced supports 364. The handle coupler 362 defines a recess 366 that is sized to receive an end of the handle 324, which is bonded to the handle coupler.

Referring to FIG. 6 specifically and FIGS. 4 and 5 generally, a plate 374 having diametrically opposed openings or ports 376, 378 is mounted onto the end of the body 358 by inserting the tabs or keys 380 into the corresponding key slots 382 on the sides of the body 358. The plate 374 is preferably made of a suitable material, such as metal, and effectively forms the other portion of a valve stack. Examples of suitable metals include stainless steel and brass. Suitable non-metals can also be used.

A tapered coil spring 352 is disposed within each of the cup seal portions 346b, 348b such that one end of the tapered spring abuts the spring seat 350, 351, respectively. A cup seal 354 is positioned within the cup seal portion 346b, 348b and over the corresponding coil spring 352. The coil spring 352 inherently biases the cup seal 354 away from the dividing wall 337. The cup seals 354 are fixed relative to the casing 312 by their location in the cup seal portion 346b, 348b of the ports 346, 348 extending through the dividing wall 337.

The plate 374 is rotatable along with the stem 356 so that openings 376, 378 of the plate 374 can be brought into and out of axial alignment with the ports 346, 348 and the cup seals 354 to permit water flow through the valve. The coil spring 352 biases the cup seals against the plate 374 a sufficient amount so that when the stem 356 is rotated to mis-align the plate ports 376, 378 with the dividing wall ports 346, 348, the cup seals 354 do not permit fluid to leak from the ports 346, 348 across the surface of the plate 374 to the plate openings 376, 378.

The cup seals 354 and corresponding coil springs 352 could be replaced by sing 0-rings positioned within the port 346, which would require a reduction in the thickness of the dividing wall 337. A groove for receiving the 0-ring could also be provided in the downstream side of the dividing wall 337.

The assembly of the fourth embodiment valve will be briefly described. It should be noted that the sequence of the assembly can easily vary with regard to the described sequence. The description of the assembly is provided to enhance the understanding of the invention and is not meant to be limiting as to a particular method of assembly.

The attachment device 326 and stem 356 are initially preassembled. The attachment device 326 is prepared for assembly by inserting the coil springs 352 and cup seals 354 into the cup seal portion 346b, 348b of the dividing wall ports 346, 348. The plate 374 is affixed to the end of the stem body 348 by pressing the keys 380 into the key slots 382 on the body 358. A bearing 384 (FIG. 4) is positioned about the exterior of the body 358 where it will abut against the interior of the attachment device when the stem 356 is assembled to the attachment device 326.

Once the attachment device 326 and stem 356 are prepared for assembly, the body 358 is inserted into the interior of the attachment device 326 until the plate 374 is adjacent the dividing wall 337, where the cup seals 354 form a watertight seal against the plate 374. The body 358 is inserted into the attachment device 326 in a manner so that a rotational stop 386, extending from the interior wall of the attachment device 326, is axially aligned with a guide slot 388 on the body 358. Preferably, the body 358 has a square-like cross section that permits the axial insertion of the body 358 over the rotational stop 386, but the body 358 contacts the stop 386 upon rotation of the body 358. A retainer 390 having an o-ring 392 is threadably mounted onto the end of the attachment device 326 after the stem 356 is inserted into the attachment device 326. The retainer 390 axially fixes the position of the body 358 relative to the attachment device. The securing of the retainer 390 to the attachment device 326 effectively draws the body 358 to the dividing wall 337, which, in combination with the coil springs 352 applies a predetermined compressive force between the plate 374 and the cup seals 354. This predetermined compressive force effectively sets the sealing pressure between the plate 374 and the cup seals 354.

The shape of the body 358 along with the rotational stop 386 of the attachment device 326 aid in aligning the dividing wall ports 346, 348 with the plate openings 374, 376. Specifically, it is preferred that the valve have a 90 degree operational range from water shut off to full water on. In achieving this operational range, the ports 346, 348 of the dividing wall 337 are oriented diametrically or 180 degrees apart. Similarly, the plate openings 376, 378 are also diametrically opposed or 180 degrees apart. The plate openings 376, 378 are oriented with respect to the body 358 so that when the body 358 is aligned with the rotational stop 386 of the attachment device 326, the dividing wall ports 346, 348 and plate openings 376, 378 will automatically be properly aligned upon the completion of the insertion.

Other operational ranges are achievable by varying the angular spacing between the ports in the dividing wall and plate. For example, a 180 degree operational range can be accomplished by provided the dividing wall and plate with one opening each and arranging the dividing wall and plate such that the ports are 180 degrees apart. If multiple ports, say two, are used in each of the dividing wall and plate, the ports on the dividing wall and plate need only be positioned on the dividing wall or plate at different radial distances from the dividing wall or plate center.

Once the stem 356 is assembled to the attachment device 326, the attachment device is inserted into the casing 312 until the casing abuts the annular seat 332 of the attachment device. The spout 304 of the hydrant 302 is then inserted over the opposite end of the casing 312 until the spout seats on the casing. The handle 324 is inserted through the open end of the spout 304 and received in the recess 366 of the handle coupler 362. It should be noted that the handle 324 could be inserted into the recess 366 prior to the mounting of the spout 304 to casing 312.

A traditional spout end cap 394 is slideably received over the handle by threading the end cap into the open end of the spout 304. The end cap 394 includes o-rings 395 and 396, that seal the end cap relative to the handle 324 and the spout 304. A bearing washer 397 is preferably positioned between the end cap 394 and the collar 325.

To complete the assembly, the control knob 306 is then mounted to the handle 324 by threading a bolt 398 through the control knob 306 into the tapped opening of the handle 324.

In operation, water is prohibited from flowing through the aligned passageways 328, 360, and 314 of the attachment device 326, stem 356, and spout 304 when the dividing wall ports 346, 348 are not aligned with the plate openings 376, 378. The dividing wall ports 346, 348 and plate openings 376, 378 are brought into and out of alignment by rotating the control knob 306, which effectively rotates the stem 356. The rotation of the control knob 306 is limited by the interference between the rotational stop 386 of the attachment device 326 and the guide slot 388 of the body 358.

Figure 7:
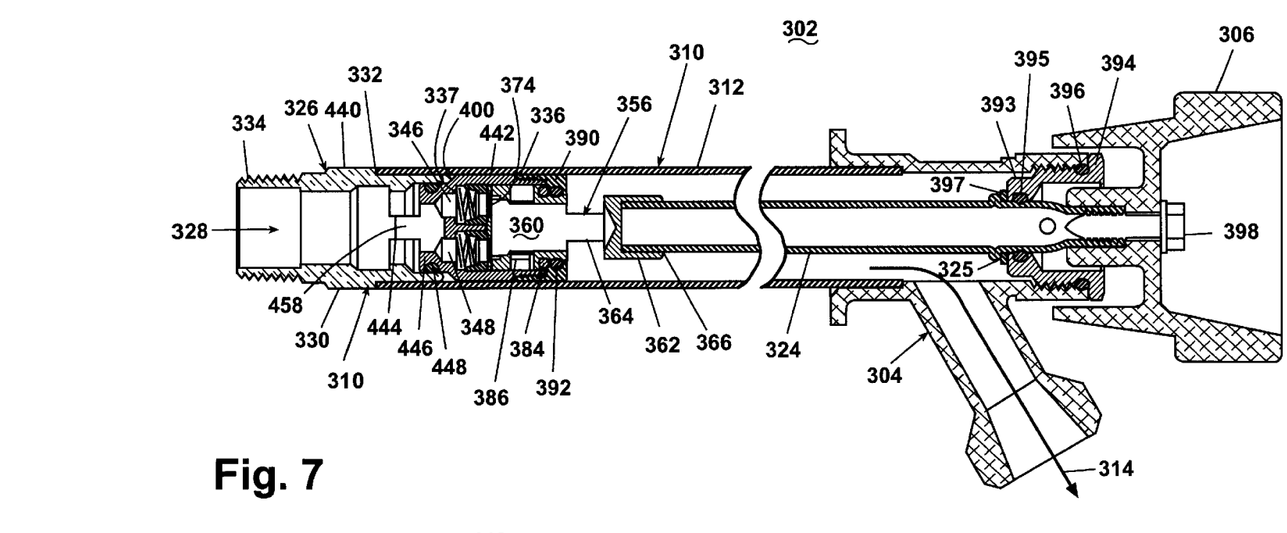
FIG. 7 is a sectional view of a fifth embodiment of the in-line valve according to the invention shown in the environment of a hydrant.
Figure 8:
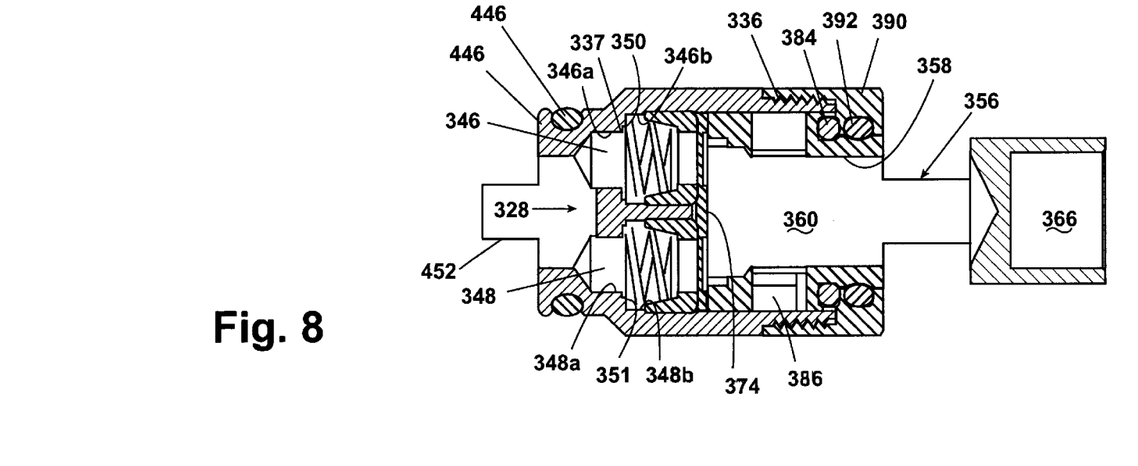
FIG. 8 is an enlarged view of the in-line valve of the fifth embodiment.

FIGS. 7 and 8 illustrate a fifth embodiment in-line valve 400, which is substantially similar to in-line valve 300. Therefore, like parts will be identified by like numerals between the fourth and fifth embodiments.

The main difference between the fourth embodiment 300 and the fifth embodiment 400 is that the attachment device 426 of the fifth embodiment is divided into two pieces, instead of one, and comprises an attachment portion 440 and a removable case 442. The attachment portion 440 comprises a collar 330, annular seat 332, external threads 334, and defines passageway 328 in a similar manner as the attachment device of the fourth embodiment. The removable case portion 442 comprises the dividing wall 337 and the ports 346, 348 of the fourth embodiment. The division of the attachment device into an attachment portion 440 and a removable case portion 442 enables the entire filter structure of the stem 356, plate 374, and cup seals 354 to be removed for maintenance purposes through the end of the spout 304 without disconnecting the hydrant from the water supply.

The attachment portion 440 includes a key slot 444 that aids in aligning the removable case portion 442 with the attachment portion 440. The removable case portion 442 comprises a reduced diameter neck 446 in which is formed an annular groove 448 that receives an o-ring 450. A pair of axially extending keys 452 extend from the neck 446 and are spaced so that they are received within the key slots 444 in the attachment portion 440.

The assembly of the fifth embodiment is identical to the assembly of the fourth embodiment except that the removable case portion 442 must be assembled into the attachment portion 440 to form the attachment device 426. The removable case portion 442 is aligned with the attachment portion 440 so that the keys 452 align with the key slots 444 and the neck 446 is then inserted into the interior of the attachment portion 440. When inserted, the o-ring 450 forms a fluid tight seal against the interior of the attachment portion 440.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

While the invention has been specifically described in connection with certain specific embodiments thereof, it is to be understood that this is by way of illustration and not of limitation, and the scope of the appended claims should be construed as broadly as the prior art will permit.

What is claimed is:

1. An in-line valve for controlling fluid flow through a supply line, the in-line valve comprising:

an outer casing defining a casing passageway having a longitudinal axis;

an attachment device mounted to the outer casing for connecting the outer casing to a supply line, the attachment device defining an attachment passageway, and comprising a dividing wall spanning the attachment passageway and having a fluid port extending therethrough;

a valve stem defining a valve stem passageway and comprising a wall spanning the valve stem passageway and having a fluid port extending therethrough, the valve stem passageway being in fluid communication with the casing passageway;

wherein the attachment device dividing wall cooperates with the valve stem wall to control fluid flow from the supply line through said valve by the movement of the valve stem wall relative to the dividing wall between an open position and a closed position where the at least one fluid port of the valve stem wall and the at least one port of the dividing wall are fluidly connected and fluidly disconnected, respectively.

2. The in-line valve according to claim 1, wherein the valve stem passageway and the attachment device passageway are axially aligned with the casing longitudinal axis.

3. The in-line valve according to claim 1, wherein the valve stem wall comprises a plate mounted to the valve stem, with the valve stem fluid port extending through the plate.

4. The in-line valve according to claim 3, and further comprising a seal surrounding one of the dividing wall fluid ports and the valve stem fluid port to seal the dividing wall relative to the plate.

5. The in-line valve according to claim 4, and further comprising multiple fluid ports in the dividing wall and plate, wherein each fluid port in the dividing wall is paired with a corresponding port in the plate.

6. The in-line valve according to claim 5, and further comprising a seal positioned around one of the fluid ports of each corresponding pair of fluid ports.

7. The in-line valve according to claim 1, and further comprising a handle connected to the valve stem and the handle having a portion that extends externally relative to the casing for rotating the valve stem relative to the attachment device.

8. The in-line valve according to claim 7, wherein the externally extending handle portion extends from the casing in a direction that is radial to the casing longitudinal axis.

9. The in-line valve according to claim 7, wherein the externally extending handle portion extends from the casing in a direction that is axial to the casing longitudinal axis.

10. The in-line valve according to claim 9, and further comprising a control knob mounted to the handle.

11. The in-line valve according to claim 9, and further comprising a spout having a passageway extending away from the casing at an angle relative to the casing longitudinal axis.

12. The in-line valve according to claim 1, wherein the attachment device comprises an attachment portion and a removable casing portion, with the dividing wall located in the removable casing portion.

13. The in-line valve according to claim 1, wherein the valve stem is rotatable relative to the attachment device wherein the valve is moved between the open and closed positions by rotating the valve stem relative to the attachment device to axially align and mis-align the at least one valve stem fluid port with the at least one dividing wall fluid port, respectively.

14. The in-line valve according to claim 13, wherein the valve stem wall comprises a plate mounted to the valve stem, with the valve stem fluid port extending through the plate.

15. The in-line valve according to claim 14, and further comprising a cup seal positioned within the dividing wall fluid port to seal the dividing wall relative to the plate.

16. The in-line valve according to claim 15, and further comprising a spring disposed within the dividing wall fluid port to bias the cup seal against the plate.

17. The in-line valve according to claim 14, wherein the attachment device comprises an attachment portion and a removable casing portion, with the dividing wall spanning the removable casing portion.

18. The in-line valve according to claim 17, and further comprising a handle connected to the valve stem and having a portion that extends externally of the casing for rotating the valve stem relative to the attachment device.

19. The in-line valve according to claim 18, wherein the valve stem comprises a body that is received within the removable casing portion, the plate is mounted to the body and the body includes a handle coupler, which connects to one end of the handle.

20. The in-line valve according to claim 19, wherein the externally extending handle portion extends from the casing in a direction that is axial to the casing longitudinal axis.

21. The in-line valve according to claim 20, and further comprising a control knob mounted to an end of the handle opposite the end of the handle mounted to the handle coupler.

22. The in-line valve according to claim 21, and further comprising a spout having a passageway extending away from the casing at an angle relative to the casing longitudinal axis.

23. An improved in-line valve for controlling fluid flow through a supply line, comprising:

an outer casing defining a casing passageway engageable with the supply line and an operating handle opening formed in and extending through a sidewall of said outer casing, the operating handle opening extending radially about a predetermined portion of said outer casing;

an attachment device receivable within and engageable with said outer casing for connecting said outer casing to the supply line, said attachment device including an attachment passageway therethrough for fluid to flow through said valve, said attachment device further including a dividing wall spanning said attachment passageway, said dividing wall having at least one fluid flow port formed therein and a seal stud extending from a first surface of said dividing wall;

a valve stem defining a valve stem passage, said valve stem mounted for selective rotation about a central axis;

a plate spanning an opening of said valve stem passage, said plate having at least one fluid port formed therein, said plate being mounted onto said valve stem so as to be axially aligned along said central axis and abutting said dividing wall, said plate being selectively rotatable between an open position and a closed position about said central axis;

wherein said plate cooperates with said dividing wall to control fluid flow through said valve, wherein said fluid ports of said dividing wall and said plate are axially mis-aligned when said plate is in said closed position and said fluid ports of said dividing wall and said plate are at least partially axially aligned when said plate is in said open position; and an operating handle received in said operating handle opening and fixedly secured to said valve stem, said operating handle having a predetermined angle of rotation about said central axis for selectively rotating said first cooperating member between said open and closed positions.

24. The in-line valve of claim 23, wherein said plate is crimped onto an end of said valve stem.

25. The in-line valve of claim 24, wherein said fluid flow ports of said plate and said dividing wall are spaced radially inwardly from a peripheral edge of said plate and said dividing wall, respectively.

26. The in-line valve of claim 24, wherein said plate and said dividing wall each have a plurality of said fluid flow ports, each of said fluid flow ports being equally spaced apart.

27. The in-line valve of claim 24, wherein said predetermined angle of rotation is less than or equal to 180°.

28. The in-line valve of claim 24, wherein said plate is constructed of steel.

29. The in-line valve of claim 24, wherein said operating handle further includes a shaft and a fastener, said shaft extending through said operating casing passageway, said fastener fixedly connecting said shaft to said valve stem.

30. The in-line valve of claim 29, wherein said operating handle further includes a bleeder cap assembly mounted to said shaft for bleeding off excessive fluid in the supply line, said assembly including a bleeder cap mounted on said shaft for axial movement to open and close a bleeder vent opening formed in a sidewall of said bleeder cap and a bleeder cap seal positioned between said shaft and a top surface of said bleeder cap, wherein said fastener further has an internal passageway formed therein extending through said bleeder seal, said bleeder vent being closed when said bleeder cap is moved axially into abutment with said fastener, thereby compressing said bleeder seal and sealing said internal passageway.

31. A hydrant for controlling fluid flow from a supply line, the hydrant comprising:

an outer casing having a cylindrical wall with open ends defining a casing passageway with a longitudinal axis and an outlet formed in a portion of the cylindrical wall between the open ends;

a spout defining a spout passageway having an inlet and an outlet, the inlet being fluidly connected to the casing outlet, and the spout passageway defines an outlet oriented at an angle relative to the casing longitudinal axis;

an attachment device mounted to the outer casing for connecting the outer casing to a supply line, the attachment device defining an attachment passageway in fluid communication with the casing passageway, and comprising a dividing wall spanning the attachment passageway and having a fluid port extending therethrough;

a valve stem defining a valve stem passageway in fluid communication with the casing passageway, and comprising a wall spanning the valve stem passageway and having a fluid port extending therethrough, the valve stem passageway being in fluid communication with the casing passageway, and the valve stem being rotatable relative to the attachment device;

a handle connected to the valve stem and having a portion that extends externally of the casing for rotating the valve stem relative to the attachment device;

wherein the attachment device dividing wall cooperates with the valve stem wall to control fluid flow from the supply line through the casing passageway by rotating the handle to rotate the valve stem between open and closed positions corresponding to the axial alignment and mis-alignment of valve stem fluid port and the dividing wall fluid port, respectively.

32. The hydrant according to claim 31, wherein the valve stem wall comprises a plate mounted to the valve stem, with the valve stem fluid port extending through the plate.

33. The hydrant according to claim 32, and further comprising a cup seal positioned within the dividing wall fluid port to seal the dividing wall relative to the plate.

34. The hydrant according to claim 33, and further comprising a spring disposed within the dividing wall fluid port to bias the cup seal against the plate.

35. The hydrant according to claim 31, wherein the attachment device comprises an attachment portion and a removable casing portion, with the dividing wall spanning the removable casing portion.

36. The hydrant according to claim 31, wherein the valve stem comprises a body that is received within the removable casing portion, the plate is mounted to the body and the body includes a handle coupler, which connects to one end of the handle.

37. The hydrant according to claim 36, wherein the handle extends in a direction that is axial to the casing longitudinal axis.

38. The hydrant according to claim 37, wherein a portion of the handle extends through one of the casing open ends and is external to the casing.

39. The hydrant according to claim 38, and further comprising a control knob mounted to the external portion of the handle.

* * * * *